US007950234B2

(12) United States Patent
Radonovich et al.

(10) Patent No.: US 7,950,234 B2
(45) Date of Patent: May 31, 2011

(54) CERAMIC MATRIX COMPOSITE TURBINE ENGINE COMPONENTS WITH UNITARY STIFFENING FRAME

(75) Inventors: David Charles Radonovich, Winter Park, FL (US); Douglas Allen Keller, Oviedo, FL (US); Jay Alan Morrison, Oviedo, FL (US); Malberto Fernandez Gonzalez, Orlando, FL (US); Anthony L. Schiavo, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 1020 days.

(21) Appl. No.: 11/581,165

(22) Filed: Oct. 13, 2006

(65) Prior Publication Data

US 2008/0087021 A1 Apr. 17, 2008

(51) Int. Cl.
*F02C 1/00* (2006.01)
*F02G 3/00* (2006.01)

(52) U.S. Cl. ....... 60/753; 415/173.1; 415/177; 415/178; 415/200; 415/173.4

(58) Field of Classification Search .................... 60/753; 415/173.1, 177, 178, 200, 116, 173.4
See application file for complete search history.

(56) References Cited

U.S. PATENT DOCUMENTS 4,626,461 A 12/1986 Prewo et al.
4,704,332 A 11/1987 Brennan et al.
6,013,592 A 1/2000 Merrill et al.
6,113,349 A 9/2000 Bagepalli et al.
6,126,389 A 10/2000 Burdgick
6,197,424 B1 * 3/2001 Morrison et al. ............. 428/402
6,200,092 B1 * 3/2001 Koschier ....................... 415/191
6,235,370 B1 5/2001 Merrill et al.
6,287,511 B1 9/2001 Merrill et al.
6,315,519 B1 11/2001 Bagepalli et al.
6,331,496 B2 12/2001 Nakayasu
6,342,269 B1 1/2002 Yoshida et al.
6,464,456 B2 10/2002 Darolia et al.
6,471,469 B2 10/2002 Toffan et al.
6,640,546 B2 * 11/2003 Lee et al. ........................ 60/752
6,641,907 B1 11/2003 Merrill et al.
6,670,046 B1 12/2003 Xia (Continued)

OTHER PUBLICATIONS

Rajiyah et al., "Thermal Shock Analysis and Testing of Simulated Ceramic Components for Gas Turbine Applications", Journal of Engineering for Gas Turbines and Power, Apr. 1996, pp. 246-250, vol. 118.

(Continued)

*Primary Examiner* — Michael Cuff
*Assistant Examiner* — Craig Kim

(57) ABSTRACT

Aspects of the invention are directed to a ring seal segment having a base portion and a frame portion. The base portion and the frame portion are a unitary structure. The frame portion is made of four unitary side walls: a forward wall, an aft wall and a pair of transverse side walls. The side walls can be arranged in a rectangular configuration. At least a part of the base portion can be coated with a thermal insulating material. A ring seal segment according to aspects of the invention is well suited to withstand the expected operational loads in the turbine section. The transverse side walls can provide bending strength to the base and can strengthen the forward and aft side walls. Transition regions between the side walls and the base portion are strengthened by three perpendicular planes that cooperate to provide structural strength to the ring seal segment.

19 Claims, 9 Drawing Sheets

U.S. PATENT DOCUMENTS

| | | | | |
|---|---|---|---|---|
| 6,676,783 | B1 | 1/2004 | Merrill et al. | |
| 6,723,382 | B2 | 4/2004 | Yamaguchi et al. | |
| 6,733,907 | B2 | 5/2004 | Morrison et al. | |
| 6,758,653 | B2 * | 7/2004 | Morrison | 415/173.4 |
| 6,854,738 | B2 | 2/2005 | Matsuda et al. | |
| 6,893,214 | B2 | 5/2005 | Alford et al. | |
| 6,895,757 | B2 | 5/2005 | Mitchell et al. | |
| 7,044,709 | B2 | 5/2006 | Bruce et al. | |
| 7,278,820 | B2 * | 10/2007 | Keller | 415/173.1 |
| 7,588,412 | B2 * | 9/2009 | Nichols et al. | 415/1 |
| 2004/0047726 | A1 * | 3/2004 | Morrison | 415/116 |
| 2004/0120835 | A1 | 6/2004 | O'Hara | |
| 2005/0092566 | A1 | 5/2005 | Good et al. | |
| 2005/0158168 | A1 | 7/2005 | Bruce et al. | |

OTHER PUBLICATIONS

Yeakle, "CFCC Review", CFCC News, Spring 1996, pp. 1-20, No. 7.

* cited by examiner

CERAMIC MATRIX COMPOSITE TURBINE ENGINE COMPONENTS WITH UNITARY STIFFENING FRAME

FIELD OF THE INVENTION

Aspects of the invention relate in general to turbine engines and, more particularly, to ceramic matrix composite components of a turbine engine.

BACKGROUND OF THE INVENTION

FIG. 1 shows an example of one known turbine engine 10 having a compressor section 12, a combustor section 14 and a turbine section 16. In the turbine section 16, there are alternating rows of stationary airfoils 18 (commonly referred to as vanes) and rotating airfoils 20 (commonly referred to as blades). Each row of blades 20 is formed by a plurality of airfoils 20 attached to a disc 22 provided on a rotor 24. The blades 20 can extend radially outward from the discs 22 and terminate in a region known as the blade tip 26. Each row of vanes 18 is formed by attaching a plurality of vanes 18 to a vane carrier 28. The vanes 18 can extend radially inward from the inner peripheral surface 30 of the vane carrier 28. The vane carrier 28 is attached to an outer casing 32, which encloses the turbine section 16 of the engine 10.

Between the rows of vanes 18, a ring seal 34 can be attached to the inner peripheral surface 30 of the vane carrier 28. The ring seal 34 is a stationary component that acts as a hot gas path guide between the rows of vanes 18 at the locations of the rotating blades 20. The ring seal 34 is commonly formed by a plurality of metal ring segments. The ring segments can be attached either directly to the vane carrier 28 or indirectly such as by attaching to metal isolation rings (not shown) that attach to the vane carrier 28. Each ring seal 34 can substantially surround a row of blades 20 such that the tips 26 of the rotating blades 20 are in close proximity to the ring seal 34.

During engine operation, high temperature, high velocity gases flow through the rows of vanes 18 and blades 20 in the turbine section 16. The ring seals 34 are exposed to these gases as well. Some metal ring seals 34 must be cooled in order to withstand the high temperature. In many engine designs, demands to improve engine performance have been met in part by increasing engine firing temperatures. Consequently, the ring seals 34 require even greater cooling to keep the temperature of the ring seals 34 within the critical metal temperature limit. In the past, the ring seals 34 have been coated with thermal barrier coatings to minimize the amount of cooling required. However, even with a thermal barrier coating, the ring seal 34 must still be actively cooled to prevent the ring seal 34 from overheating and burning up. Such active cooling systems are usually complicated and costly. Further, the use of greater amounts of air to cool the ring seals 34 detracts from the use of air for other purposes in the engine.

As an alternative, the ring seals 34 could be made of ceramic matrix composites (CMC), which have higher temperature capabilities than metal alloys. By utilizing such materials, cooling air can be reduced, which has a direct impact on engine performance, emissions control and operating economics. However, there are a number of natural limitations and manufacturing constraints associated with CMC materials. For instance, laminated CMC materials (oxide and non-oxide based) can have anisotropic strength properties. The interlaminar tensile strength (the "through thickness" tensile strength) of the CMC can be substantially less than the in-plane strength. In addition, anisotropic shrinkage of the matrix and the fibers can result in de-lamination defects, particularly in small radius corners and tightly-curved sections, which can further reduce the interlaminar tensile strength of the material.

Ceramic matrix composite ring segments would typically be attached to the metal backing hardware away from the gas path where temperatures are more favorable for metals. However, as a result of such an arrangement, some of the CMC features are situated out of plane; that is, the fibers of the CMC material are not parallel to the surface of the component exposed to the hot gas path. Such out of plane features include, but are not limited to, flanges, hooks, T-joints, etc. During engine operation, differential pressure loads and other mechanical loads must be reacted by these out-of-plane features with the load path through a transition region between the features and the hot gas path surface. For instance, some ring seal segments are cooled by supplying a pressurized coolant to the backside (or "cold" side) of the ring seal segment. The coolant is at a greater pressure than the hot gases flowing through the turbine section to prevent the hot gas from being ingested in this area. As a result, the ring seal segment is subjected to pressure loading, which must be transmitted to the attachment points of the CMC ring seal segment. However, in order to do so, the pressure loading must be transmitted to the attachment points on the out of plane CMC features through a transition region (such as a fillet or other transition region) where the material is weakest. Such areas tend to be design-limiting features of these components.

Thus, there is a need for a CMC ring seal segment construction that can minimize the limiting aspects of CMC material properties and manufacturing constraints and improve the mechanical loading capability.

SUMMARY OF THE INVENTION

Aspects of the invention are directed to a ceramic matrix composite turbine engine component. The component has body with a base portion and frame portion. The base portion and the frame portion are unitary. The base portion can have a radially inner surface, at least a portion of which can be coated with a thermal insulating material. The frame portion includes three or more unitary side walls that enclose a space. Each side wall transitions at opposite ends into one of the other side walls. Each side wall extends substantially radially outward from the base portion. Each side wall transitions into the base portion such that the frame portion is closed on one side. In one embodiment, one or more reinforcing walls can be enclosed by the three or more side walls. The reinforcing wall can be unitary with the base portion and one or more of the side walls of the frame portion.

In one embodiment, the body can be operatively connected to a combustor liner. In such case, the turbine engine component is a heat shield. Alternatively, the turbine engine component can be a ring seal segment. In such case, two or more of the side walls can be operatively connected to a stationary turbine support structure.

The turbine engine component is made of ceramic matrix composite, which can include a ceramic matrix in which a plurality of fibers are embedded. The fibers can be provided in the form of a plurality of plies.

The transition between two side walls can occur in a transition region. At least some of the fibers can span continuously across the transition region and can extend into a portion of each of the two side walls. More particularly, at least about 25% of the fibers in the transition region can span continuously across the transition region and can extend into a portion of each of the two side walls. Alternatively or in addition, at least about 50% of the plies in the transition region can span continuously across the transition region and extend into a portion of each of the two side walls.

The transition between the base portion and one or more of the side walls can occur in a transition region. At least some of the fibers can span continuously across the transition region and can extend into a portion of the base portion as well as into a portion of the respective side wall. More particularly, at least about 25% of the fibers in the transition region can span continuously across the transition region and can extend into a portion of the base portion as well as into a portion of the respective side wall. Alternatively or in addition, at least about 50% of the plies in the transition region can span continuously across the transition region and can extend into a portion of each of the respective side wall and the base portion.

Aspects of the invention are also directed to a turbine engine ring seal segment. The ring seal segment has a ring seal segment body that is made of ceramic matrix composite, which can be, for example, an oxide-based ceramic matrix composite. The ring seal body has a base portion and frame portion. According to aspects of the invention, the base portion and the frame portion are unitary.

The base portion has a radially inner surface. At least a portion of the radially inner surface of the base portion can be coated with a thermal insulating material. The frame portion extends substantially radially outward from the base portion. The frame portion has a forward side wall and an opposite aft side wall. Further, the frame portion includes a first transverse side wall and an opposite second transverse side wall. The first and second transverse side walls are angled relative to the forward and aft side walls. The forward side wall transitions at opposite ends into each of the first and second transverse side walls. Likewise, the aft side wall transitions at opposite ends into the first and second transverse side walls.

In one embodiment, the forward and aft side walls can be substantially parallel to each other, and the first and second transverse side walls can be substantially parallel to each other. In such case, the frame portion can be substantially parallelogrammatic. In another embodiment, the forward and aft side walls can be substantially parallel to each other, while the first and second transverse side walls can be non-parallel to each other. As a result, the frame portion can be substantially trapezoidal in conformation.

The ceramic matrix composite can include a ceramic matrix and a plurality of fibers embedded in the ceramic matrix. The fibers can be provided in any suitable form, such as one or more plies.

The transition between two side walls can occur in a transition region. At least about 25% of the fibers in the transition region can span continuously across the transition region and can extend into a portion of each of the two side walls. Alternatively or in addition, at least about 50% of the plies in the transition region can span continuously across the transition region and can extend into a portion of each of the two side walls.

The transition between the base portion and one or more of the side walls can occur in a transition region. At least about 25% of the fibers in this transition region can span continuously across the transition region and can extend into a portion of the base portion and into the respective side wall. Alternatively or in addition, at least about 50% of the plies in the transition region can span continuously across the transition region and can extend into a portion of the base portion and the respective side wall.

DETAILED DESCRIPTION OF EMBODIMENTS OF THE INVENTION

Embodiments of the invention are directed to a construction for a ceramic matrix composite turbine engine component. Aspects of the invention will be explained in connection with a ring seal segment, but the detailed description is intended only as exemplary. An embodiment of the invention is shown in FIGS. 2-10, but the present invention is not limited to the illustrated structure or application.

Figure 1:
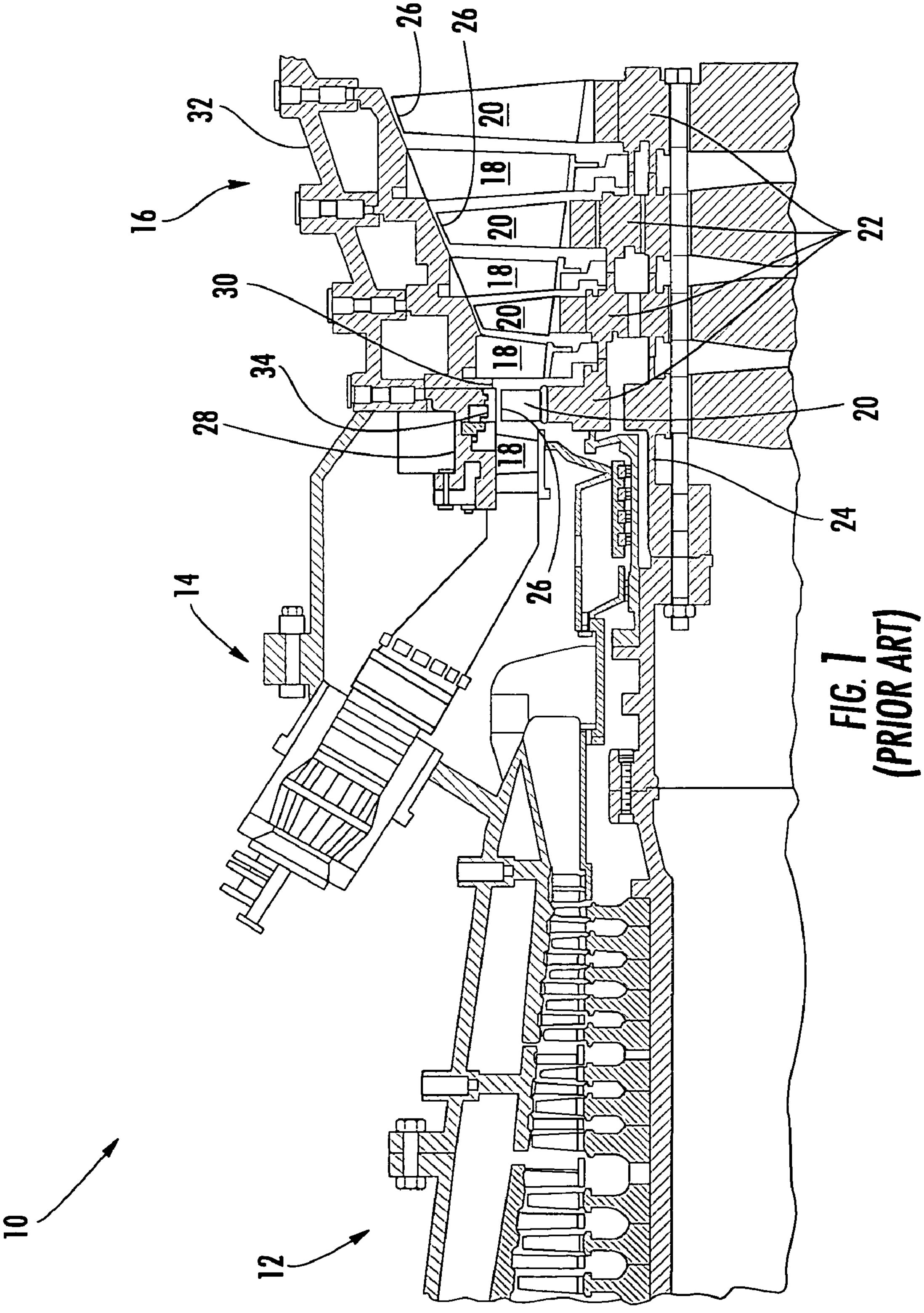
FIG. 1 (PRIOR ART)
FIG. 1 is a cross-sectional view of the turbine section of a known turbine engine.
Figure 2:
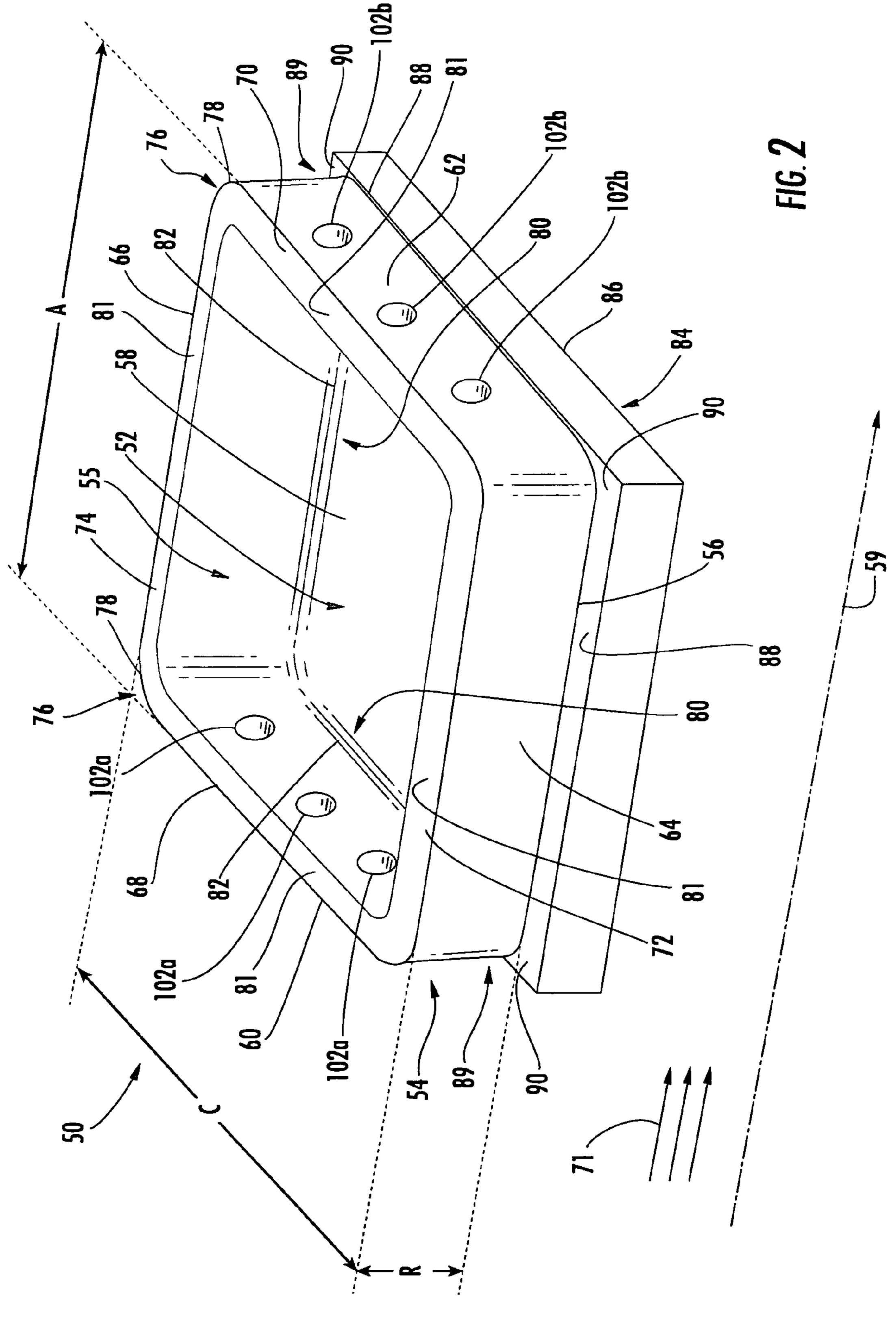
FIG. 2 is an isometric view of a ring seal segment according to aspects of the invention, wherein the ring seal segment has a frame portion with four side walls arranged in a parallelogrammatic configuration.

FIG. 2 shows a ring seal segment 50 according to aspects of the invention. The ring seal segment 50 can include a base portion 52 and a frame portion 54 having at least three side walls. According to aspects of the invention, the ring seal segment 50 is a unitary construction. That is, the base portion 52 and the frame portion 54 are a single piece. More particularly, the side walls of the frame portion 54 are formed together as a single piece, and the side walls are formed together as a single piece with the base portion 52. A ring seal segment 50 according to aspects of the invention is to be contrasted with a ring seal segment construction in which at least a part of the frame portion is formed separately and subsequently joined to the rest of the frame portion and also with the base. Such a multi-piece design is not preferred because it would have a lower strength compared to the ring seal segment according to aspects of the invention. Moreover, the multi-piece construction would have weaker joints in areas of the ring seal segment where the operational loads are carried.

The base portion 52 can have a radially inner surface 56 and a radially outer surface 58. The ring seal segment 50 can have an axial forward side 60 and an axial aft side 62. Further, the ring seal segment 50 can have a first circumferential side 64 and a second circumferential side 66. The terms "axial," "radial" and "circumferential" and variations thereof are intended to mean relative to the turbine axis 59 when the ring seal segment 50 is installed in its operational position.

The base portion 52 can have any of a number of suitable configurations. In one embodiment, the base portion 52 can be substantially flat. In another embodiment, the base portion 52 can be curved circumferentially as it extends from the first circumferential side 64 to the second circumferential side 66. The entire base portion 52 can be arcuate or otherwise curved. Alternatively, a portion of the base portion 52 can be curved. For example, in one embodiment, only the radially inner surface 56 of the base portion 52 may be radially inwardly concave. In such case, the radially outer surface 58 of the base portion 52 can be substantially flat. The term "radially inwardly concave" means that the radially inner surface 56 of the base portion 52 is curved so that it opens to the turbine axis 59. Further, the term "radially inwardly concave" can include embodiments in which the radially inner surface 56 is substantially cylindrical, such that each point on the radially inner surface 56 can be at a substantially uniform radial distance from the turbine axis 59. In addition, "radially inwardly concave" can include a radially inner surface that is conical. Depending on its circumferential length and its radius of curvature, the base portion 52 may have negligible curvature such that it is substantially flat. For example, if the circumferential length of the base portion 52 is sufficiently short and/or when the radius of curvature of the base portion 52 is sufficiently large, the base portion 52 can be substantially flat.

The frame portion 54 can be made of at least three side walls, so as to enclose a space 55 therein. In one embodiment, the frame portion 54 can have four side walls: a forward side wall 68, an aft side wall 70, a first transverse side wall 72 and a second transverse side wall 74. The terms "forward" and "aft" are intended to mean relative to the direction of the gas flow 71 through the turbine section when the ring seal segment 50 is installed in its operational position. The forward and aft side walls 68, 70 can be axially spaced from each other. Further, the forward and aft side walls 68, 70 can be substantially parallel to each other. Each of the transverse side walls 72, 74 is angled relative to the forward and aft side walls 68, 70. In one embodiment, the transverse side walls 72, 74 extend at substantially 90 degrees relative to both the forward and aft side walls 68, 70. The first and second transverse side walls 72, 74 can be substantially parallel to each other. In some instances, first and second transverse side walls 72, 74 can be non-parallel. Depending on their relationships to each other, the four side walls 68, 70, 72, 74 can collectively have various general conformations, including, for example, substantially rectangular, parallelogrammatic or trapezoidal in conformation.

Figure 9:
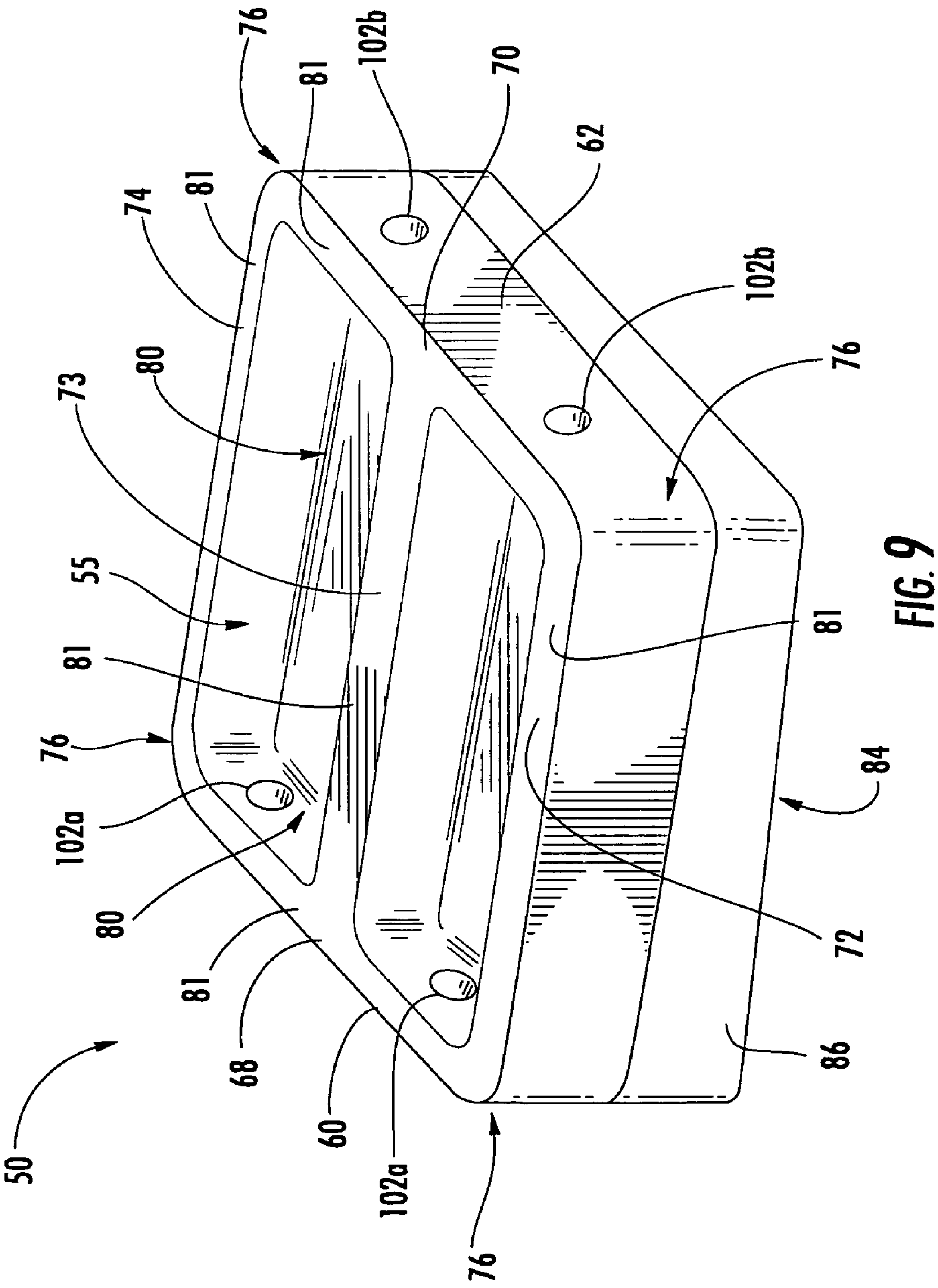
FIG. 9 is an isometric view of a ring seal segment according to aspects of the invention, wherein the ring seal segment has a frame portion with four side wall enclosing a reinforcing wall.

It should be noted that the frame portion 52 can include other walls in addition to the side walls. For example, as shown in FIG. 9, there can be one or more reinforcing walls 73 within the space 55 enclosed by the four side walls 68, 70, 72, 74. These reinforcing walls can be unitary with the base portion 52 and/or one or more of the side walls 68, 70, 72, 74. While FIG. 9 shows a reinforcing wall 73 connecting between the forward and aft side walls 68, 70, a reinforcing wall can connect any of the side walls 68, 70, 72, 74.

Figure 7:
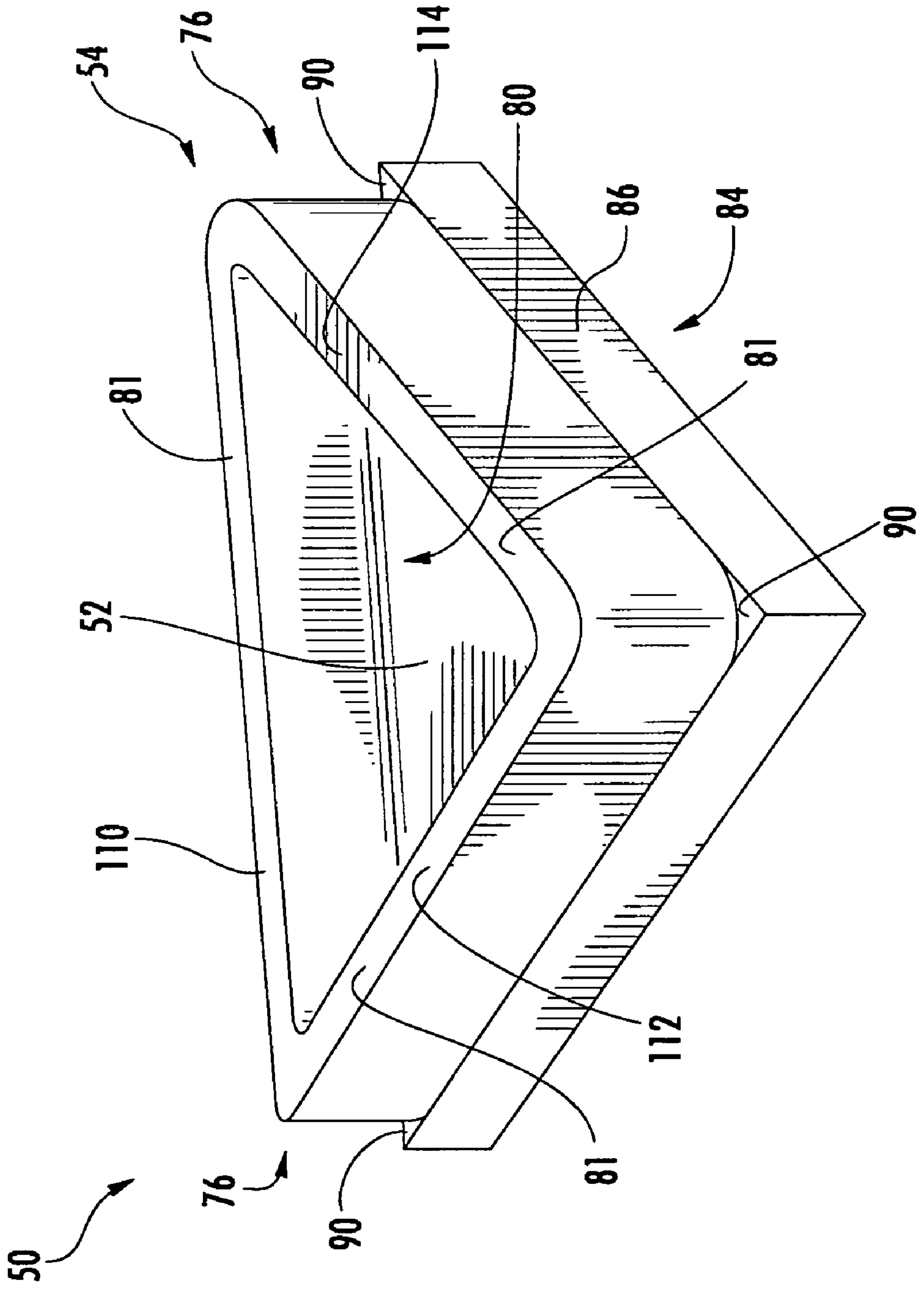
FIG. 7 is an isometric view of a ring seal segment according to aspects of the invention, wherein the ring seal segment has a frame portion with three side walls arranged in a triangular configuration.
Figure 8:
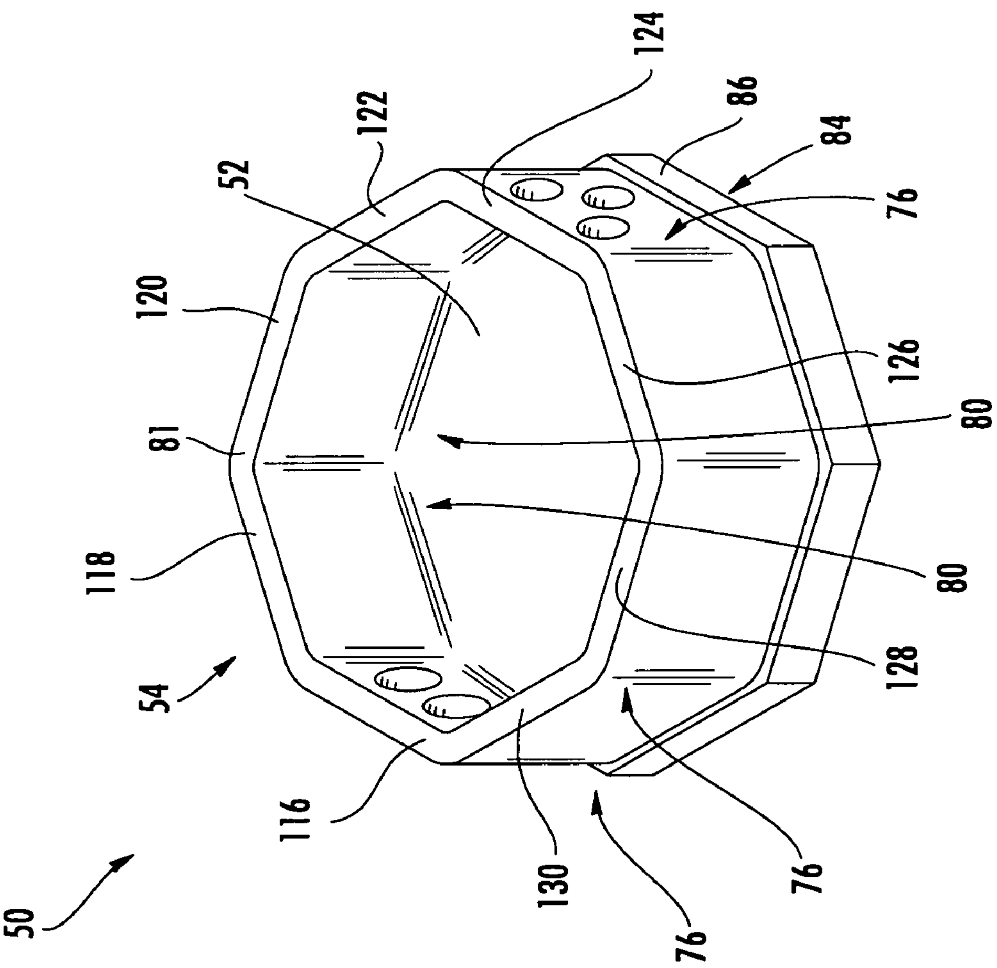
FIG. 8 is an isometric view of a ring seal segment according to aspects of the invention, wherein the ring seal segment has a frame portion with eight side walls arranged in a polygonal configuration.

While the foregoing and subsequent description is directed to an embodiment in which the frame portion has four side walls, it should be noted that a ring seal segment according to aspects of the invention is not limited to a frame portion with four side walls. As noted earlier, the frame portion 52 can have three or more side walls. For example, in one embodiment, the frame portion 52 can have three side walls 110, 112, 114, as shown in FIG. 7. In such case, the frame portion 52 can be generally triangular in conformation. In another embodiment, the frame portion 52 can have five or more side walls. As a result, the frame portion 52 can be generally polygonal in conformation. FIG. 8 shows an example of a ring seal segment 50 having a frame portion 52 with eight side walls 116, 118, 120, 122, 124, 126, 128, 130, so as to be generally octagonal in conformation. For convenience, the description herein will be directed to a frame portion with four side walls; however, it will be understood that the description herein is equally applicable to these other frame portions according to aspects of the invention.

Referring to FIG. 2, each of the forward and aft side walls 68, 70 can have an associated circumferential length C and radial length R. The circumferential length C and radial length R of each of the forward and aft side walls 68, 70, 72 can be sized as desired depending on the application at hand. In one embodiment, the forward and aft side walls 68, 70 have substantially the same circumferential and radial lengths C, R. However, the forward and aft side walls 68, 70 can have different circumferential and/or radial lengths C, R.

The first and second transverse side walls 72, 74 can have an associated axial length A and radial length R, which can be sized as desired depending on the application at hand. The first and second transverse side walls 72, 74 can have any suitable axial length A and radial length R. In one embodiment, the first and second transverse side walls 72, 74 can have substantially the same axial and radial lengths A, R. However, the first and second transverse side walls 68, 70 can have different circumferential and/or radial lengths C, R.

In one embodiment, the forward and aft side walls 68, 70 can have substantially the same radial length as the first and second transverse side walls 72, 74. Further, the circumferential length C of the forward and aft side walls 68, 70 can be substantially equal to the axial length A of the first and second transverse side walls 72, 74. However, the first and second transverse side walls 72, 74 may be shorter or longer than the forward and aft side walls 72, 74 in one or more of the axial, circumferential and radial directions A, C, R.

The thickness of the ring seal segment 50 can be substantially uniform throughout; that is, the thickness of the side walls 68, 70, 72, 74 can be substantially identical to each other and to the thickness of the base portion 52. However, the thickness of at least one of the walls 68, 70, 72, 74 and/or the base 52 can be different. The variation in thickness can be gradual across one or more of the associated lengths of a side wall, or the thickness can be varied in local areas. The thickness of one or more of the side walls 68, 70, 72, 74 can vary, as may be needed to facilitate installation into the engine, hardware attachment and dimensional control. Further, variation in the thickness of one of more of the side walls 68, 70, 72, 74 can be helpful to in the management of mechanical loading of the ring seal segment 50 as well as vibratory wear and subsequent material loss.

The transition region 76 between two of the side walls can have any suitable form. For example, as shown in FIG. 2, the transition region 76 can be defined by a fillet 78, including regular, compound and elliptical fillets. Alternatively, the transition region 76 can be defined by, for example, one or more facets, bevels, or chamfers including elongated chamfers. Each of the four side walls 68, 70, 72, 74 can transition into the base portion 52. Thus, one side of the frame portion 54 is closed by the base, while the other end of the frame portion 54 can remain substantially open. The transition region 80 between each side wall 68, 70, 72, 74 and the base portion 52 can have any of a number of configurations. In one embodiment, the transition region 80 can be defined by a fillet 82, including regular, compound and elliptical fillets. Alternatively, the transition region 80 can be defined by, for example, one or more facets, bevels, or chamfers including elongated chamfers.

The four side walls 68, 70, 72, 74 can extend from the base portion 52 at any suitable angle. In one embodiment, each of the side walls 68, 70, 72, 74 can extend at substantially 90 degrees from the base portion 52. Thus, when the ring seal segment 50 is installed in its operational position, the side walls 68, 70, 72, 74 can extend substantially radially outward relative to the turbine axis 59. One or more of the side walls 68, 70, 72, 74 can extend at angles greater than or less than 90 degrees so as to form an acute or obtuse angle relative to the base portion 52. Ideally, the side walls 68, 70, 72, 74 extend at the same angle relative to the base portion 52; however, one or more of the side walls 68, 70, 72, 74 can extend from the base portion 52 at a different angle.

The frame portion 52 can have an outer surface 81, which can be collectively defined by the side walls 68, 70, 72, 74 and the transition regions 76 therebetween. The outer surface 81 can have any suitable conformation. For instance, the outer surface 81 can be substantially flat. Alternatively, the outer surface 81 can be substantially conical or a substantially cylindrical. It will be understood that the outer surface 81 can have any suitable surface contour.

The ring seal segment 50 can be made of ceramic matrix composite (CMC). The CMC can be an oxide based CMC. For example, the ring seal segment 50 can be made of an oxide-oxide CMC, such as AN-720, which is available from COI Ceramics, Inc., San Diego, Calif. In one embodiment, the ring seal segment 50 can be made of a hybrid oxide CMC material, an example of which is disclosed in U.S. Pat. No. 6,733,907, which is incorporated herein by reference.

The CMC material of the ring seal segment 50 includes a ceramic matrix 77 and a plurality of reinforcing fibers 75 (only a few fibers are shown in FIG. 2 to facilitate discussion) within the matrix 77. The CMC can have any suitable fiber architecture. The fibers 75 of the CMC can be oriented to provide the desired strength properties. For instance, the fibers 75 can be oriented to provide anisotropic, orthotropic, or in-plane isotropic properties. In one embodiment, a substantial majority of the fibers 75 in the base portion 52 can extend substantially parallel to the flow path 71 of the turbine. For instance, in the base portion 52, at least some of the fibers can extend from the axial forward side 60 toward the axially aft side 62 of the ring seal segment 50. In addition, at least some of the fibers 75 can extend from the first circumferential side 64 toward the second circumferential side 66. In one embodiment, the fibers 75 can be arranged at substantially 90 degrees relative to each other, such as a 0-90 degree orientation or a +/−45 degree orientation. The fibers 75 can also be provided in multiple layers or laminate plies 79.

Figure 6:
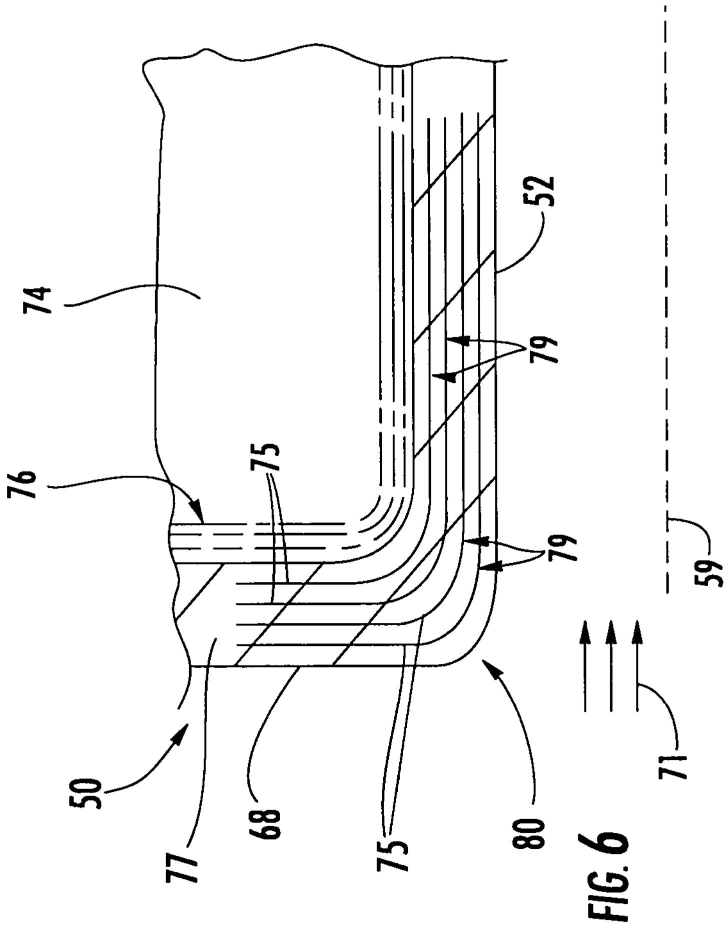
FIG. 6 is a cross-sectional view of the transition region between a base portion and a side wall of a ring seal segment according to aspects of the invention.

Between each of the side walls 68, 70, 72, 74 and the base portion 52, at least some of the reinforcing fibers 75 and/or laminate plies 79 span continuously across the transition region 80; that is, at least some of the fibers 75 and/or laminate plies 79 extend unbroken across the transition region 80 and into the base portion 52 and each of the respective side walls 68, 70, 72, 74. An example of such an arrangement between the forward side wall 68 and the base portion 52 is shown in FIG. 6. Preferably, at least 25% of the reinforcing fibers 75 and/or at least 50% of the laminate plies 75 in the transition region 80 are continuous between the base portion 52 and each of the side walls 68, 70, 72, 74.

Figure 5:
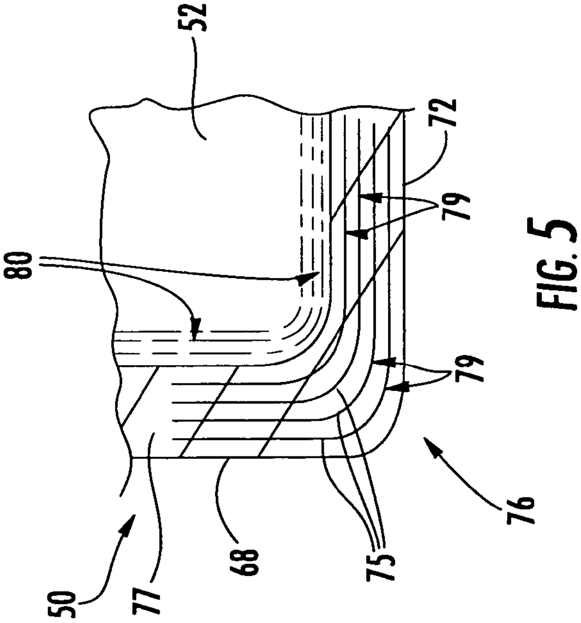
FIG. 5 is a cross-sectional view of the transition region between two side walls of a ring seal segment according to aspects of the invention.

In addition, at least some of the reinforcing fibers 75 and/or laminate plies 79 span continuously across the transition region 76 between a connected pair of the side walls 68, 70, 72, 74. In other words, at least some of the fibers 75 and/or laminate plies 79 extend unbroken across the transition region 76 and into the respective pair of the side walls 68, 70, 72, 74. FIG. 5 shows an example of such an arrangement between the forward side wall 68 and the first transverse side wall 72. Preferably, at least 25% of the reinforcing fibers 75 and/or laminate plies 79 in the transition region 76 are continuous across one or more of the transition regions 76 between connecting side walls 68, 70, 72, 74.

Again, the above fibers arrangements in the CMC described above are merely examples. It will be understood that the fibers of the CMC can be arranged as needed.

The ring seal segment 50 can be formed by any suitable fabrication technique, such as winding, weaving, and fabric or unidirectional tape lay-ups. In one embodiment, ceramic fabric can be preimpregnated with matrix slurry and can be formed into or onto a mold. Each fabric ply 79 can be cut with a unique pattern such that during lay-up, any fabric splices are not aligned between adjacent plies or occur within a minimum specified distance from splices in other superimposed plies. In addition, the individual plies 79 can be formed to have most or all of the fibers 75 in the base portion 52 that extend continuously into each of the four side walls 68, 70, 72, 74 with minimal splices. Also, the necessary darts cut to allow formation of the transition regions 76, 80 and the sidewalls 68, 70, 72, 74 are designed to account for displacement that can occur from compaction of the laminae such that, in the compacted state, the splices can form butt-joints with minimal gap. Compaction can be by any of various forms, including hard tooling, pressure, vacuum, or combinations thereof. In the final state, the spliced joints can be distributed uniformly across either side of the transition regions 76, 80, thus retaining most of the reinforcing fibers 75 intact across the transition regions 76, 80.

It can be seen that various embodiments can alter the amount and method of reinforcing fiber 75 joining the base portion 52 and the sidewalls 68, 70, 72, 74 as well as the mating sidewalls 68, 70, 72, 74 to each other.

Because the ring seal segment 50 is exposed to the hot combustion gases during engine operation, at least a portion of the radially inner surface 56 of the ring seal segment 50 can be coated with a thermal insulating material 84. The thermal insulating material 84 can be, for example, a friable graded insulation (FGI) 86. Various examples of FGI are disclosed in U.S. Pat. Nos. 6,676,783; 6,670,046; 6,641,907; 6,287,511; 6,235,370; and 6,013,592, which are incorporated herein by reference. A layer of adhesive or other bond-enhancing material (not shown) can be used between the CMC ring seal segment 50 and the thermal insulating material 84 to facilitate attachment.

The thermal insulating material 84 can be applied over at least a portion of the radially inner surface 56 of the base portion 52. In one embodiment, the thermal insulating material 84 can completely cover the radially inner surface 56 of the base portion 52. The thickness of the thermal insulating material 84 can be substantially uniform, but, in some cases, it may be preferred if the thickness of the thermal insulating material 84 is non-uniform. The variation in thickness of the thermal insulating material 84 can occur in one or more directions, or it may vary in localized regions. FIG. 9 shows an embodiment in which the thickness of the thermal insulating material 84 decreases as it extends from the axial forward side 60 of the ring seal segment 50 to the axial aft side 62 of the ring seal segment 50.

Figure 4:
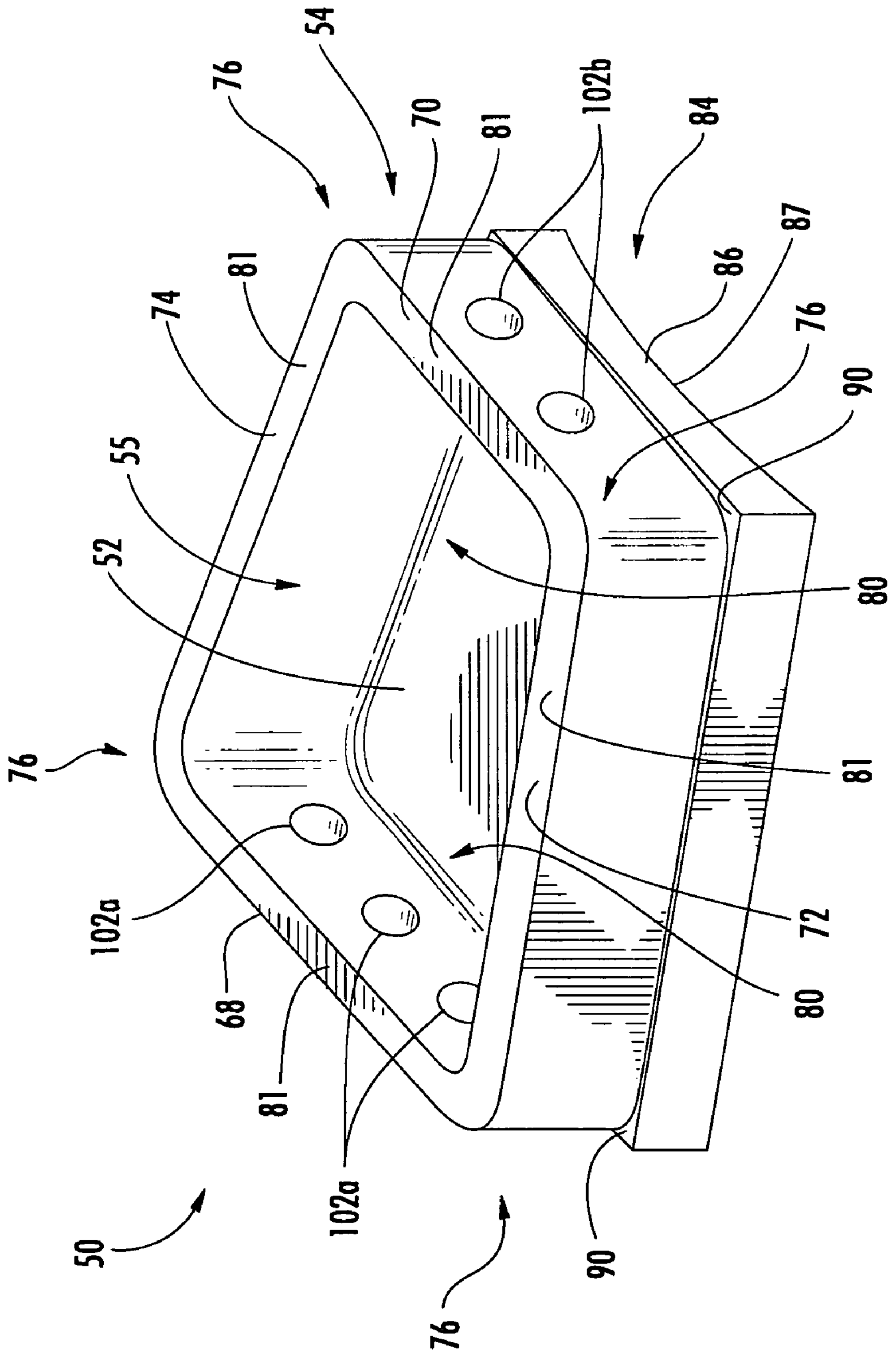
FIG. 4 is an isometric view of a ring seal segment according to aspects of the invention, wherein the ring seal segment has a frame portion with four side walls arranged in a trapezoidal configuration.

The thermal insulating material 84 can have a radially inner surface 87 that can form a gas path sealing surface during engine operation. The radially inner surface 87 can be substantially flat. Alternatively, as is shown in FIG. 4, the radially inner surface 87 can be radially inwardly concave, as described above.

Figure 3:
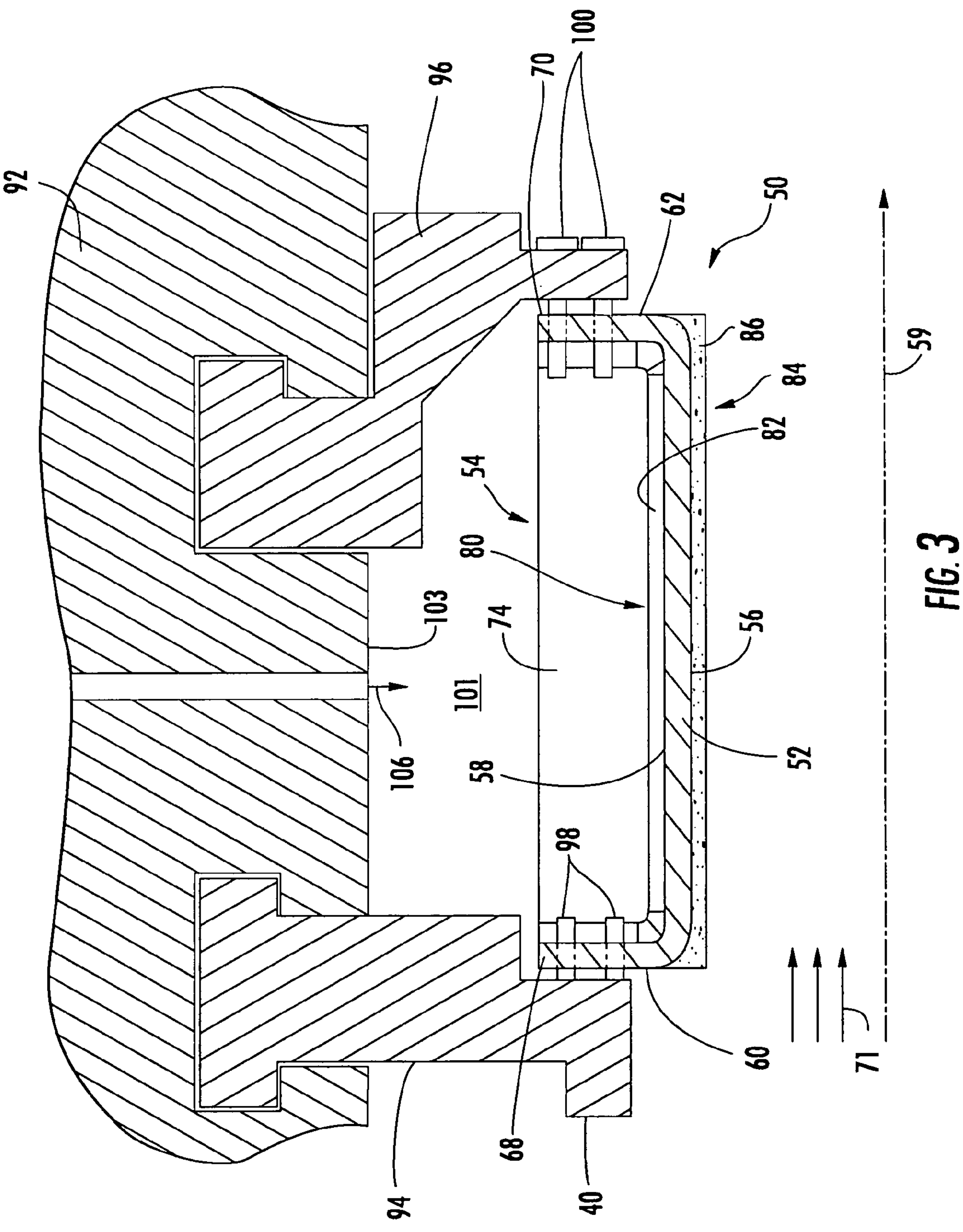
FIG. 3 is a cross-sectional view of a ring seal segment according to aspects of the invention, wherein the ring seal segment is attached to a turbine stationary support structure.

The thermal insulating material 84 can terminate substantially at each side 60, 62, 64, 66 of the ring seal segment 50. FIG. 3 shows an embodiment in which the thermal insulating material 84 terminates substantially at each of the axial forward side 60 and axial aft side 62 of the ring seal segment 50. However, in some instances, the thermal insulating material 84 can extend beyond at least one of the sides 60, 62, 64, 66 of the ring seal segment 50, as shown in FIG. 2. In such case, the portion of the thermal insulating material 84 that extends beyond the side can form a ledge 88. Further, the thermal insulating material 84 can terminate at each corner 89 formed by the transition between two side walls and the base 52. However, in some instances, the thermal insulating material 84 can extend beyond the corner 89. For example, as shown in FIG. 2, the thermal insulating material 84 extends beyond each corner 89 such that a landing 90 or other continuation of the ledge 88 is formed. In the embodiment shown in FIG. 2, the thermal insulating material 84 extends beyond the entire perimeter of the ring seal segment 50.

A ring seal segment 50 according to aspects of the invention can be installed in the turbine section of the engine in any suitable way. For instance, the ring seal segment 50 can be operatively connected to one or more stationary support structures in the turbine section of the engine including, for example, the turbine casing (not shown), a vane carrier 92 (see FIG. 3), forward and an aft isolation rings 94, 96 that extend radially inward from the vane carrier 92, an adapter (not shown) or other connecting structure. As shown in FIG. 3, the ring seal segment 50 can be suspended between the isolation rings 94-96. A space 101 can be defined between the ring seal segment 50 and an inner peripheral surface 103 of the vane carrier 92.

The ring seal segment 50 can be operatively connected to the stationary support structure in any of a number of ways. Preferably, at least two of the side walls 68, 70, 72, 74 of the ring seal segment 50 are operatively connected to the stationary support structure. In one embodiment, one or more fasteners can be used to operatively connect the ring seal segment 50 and the stationary support structure. For example, the ring seal segment 50 can be operatively connected to the stationary support structure using pins. A first plurality of pins 98 can operatively connect the forward isolation ring 94 to the forward side wall 68 of the ring seal segment 50, and a second plurality of pins 100 can operatively connect the aft isolation ring 96 to the aft side wall 70 of the ring seal segment 50.

The pins 98, 100 can be made of any suitable material, such as metal. The pins 98, 100 can have any cross-sectional shape, such as circular, polygonal or rectangular. The first and second plurality of pins 98, 100 may or may not be substantially identical to each other. At least some of the pins 98, 100 can be removable. It will be understood that such an arrangement is provided to facilitate discussion, and aspects of the invention are not limited to such an arrangement.

Any quantity of pins 98, 100 can be used to operatively connect the forward side wall 68 and the forward isolation ring 94. In one embodiment, each of the first plurality of pins 98 and the second plurality of pins 100 can include three pins. The number and arrangement of the pins 98, 100 can be optimized for the load conditions and specific geometric allowances. In one embodiment, the quantity and/or the arrangement of the first plurality of pins 98 can be substantially identical to the quantity and the arrangement of the second plurality pins 100. However, the quantity and/or arrangement of the first plurality of pins 98 can be different from the quantity and arrangement of second plurality of pins 100. At least some of the pins 98, 100 can be threaded.

The ring seal segment 50 can be adapted to facilitate operative connection to the stationary support structure. In one embodiment, the forward and aft side walls 68, 70 can include one or more passages 102*a*, 102*b* to receive the pins 98, 100 so as to operatively connect the ring seal segment 50 and the isolation rings 94, 96. FIG. 2 shows a plurality of passages 102*a* formed in the forward side wall 68 of the ring seal segment 50, and a plurality of passages 102*b* formed in the aft side wall 70 of the ring seal segment 50.

Naturally, the passages 102*a*, 102*b* can be sized and arranged to correspond to receive the first and second plurality of pins 98 and 100, respectively. The passages 102*a*, 102*b* in the ring seal segment 50 can be oversized or slotted to allow for differential thermal expansion between the ring seal segment 50, the isolation rings 94, 96, and the pins 98, 100. Preferably, at least one of the passages 102*a* in the forward side wall 68 and at least one of the passages 102*b* in the aft side wall 70 can be substantially circular or otherwise shaped to substantially correspond to the cross-sectional shape of the pins 98, 100 received therein. The passages 102*a*, 102*b* can be formed in the spans 58, 60 by any suitable process.

Additional ring seal segments 50 can be attached to the stationary support structure in a similar manner to that described above. The plurality of the ring seal segments 50 can be installed so that each circumferential side 64, 66 of one ring seal segment 50 substantially abuts one of the circumferential side 64, 66 of a neighboring ring seal segment 50 so as to collectively form an annular ring seal. The ring seal substantially surrounds a row of blades such that the tips of the rotating blades are in close proximity to the ring seal. In cases where the thermal insulating material 84 extends beyond the circumferential sides 64, 66 of the ring seal segment 60, the ledge 88 of one ring seal segment 50 can substantially abut the ledge 88 of a neighboring ring seal segment 50.

During engine operation, the ring seal segment 50 will be exposed to the high temperature combustion gases 71. Because the ring seal segment 50 is made of a ceramic material, it can withstand the exposure to the hot gases 71 in the turbine section. Nonetheless, some cooling should be provided to the ring seal segment 71, though it will be appreciated that the amount of coolant needed will be less than that required for a metal ring seal. In one embodiment, a coolant 106, such as air or other suitable fluid, can be supplied in the space 101. The source of the coolant can be internal or external to the engine. Sealing can be provided as appropriate to minimize the escape of coolant 106 into the hot gas path 71.

During engine operation, the ring seal segments 50 can be subjected to a variety of loads. The ring seal segment 50 according to aspects of the invention is well suited to withstand the expected operational loads. For instance, the base portion 52 can be subjected to bending forces due to, among other things, the pressure differential across it. The side walls 68, 70, 72, 74 stiffen the base portion 52, and they provide bending strength to the base portion 52. Further, the first and second transverse side walls 72, 74 can strengthen the forward and aft side walls 68, 70 by acting as braces. The benefit is most pronounced for CMC materials with a low elastic modulus, such as oxide-oxide CMC materials, in which the material compliance assists in load redistribution from peak locations to neighboring side walls. In addition, the ability of oxide-based CMCs to operate in a nonlinear stress-strain regime also adds to the potential load sharing of such redundant load-bearing structures. Load (e.g., pressure or other mechanical load) can be reacted by the fasteners attaching the respective side walls to the stationary support structure, and can be transmitted through the CMC material in an in-plane orientation.

The ring seal segment 50 according to aspects of the invention can have relatively small radii of curvature in the transition region 80 between each side wall 68, 70, 72, 74 and the base portion 52, despite past problems with forming CMC structures such geometry. The ring seal segment 50 according to aspects of the invention can minimize these prior issues because the ring seal segment 50 is strengthened by three substantially perpendicular planes (defined by the base portion 52 and two of the side walls) that cooperate to provide structural strength to the ring seal segment 50. Because the unitary construction strengthens the ring seal segment 50, thinner CMC sections can be used compared to a ring seal segment design with separately formed and subsequently joined sidewalls. Such relatively thinner sections can appreciably reduce thermal stresses during operation.

Figure 10:
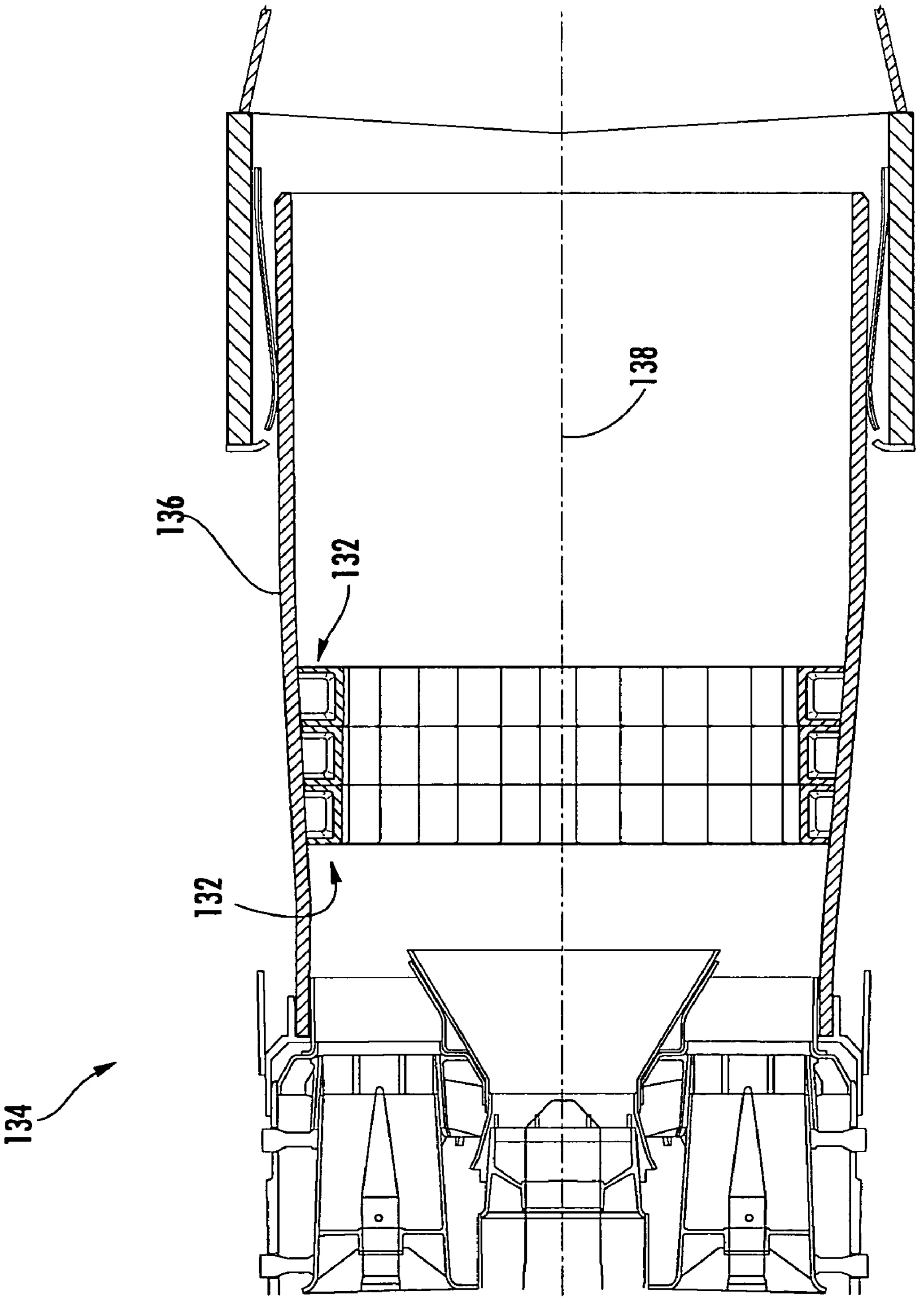
FIG. 10 is a cross-sectional view of a combustor section of a turbine engine, wherein a combustor liner is fitted with a plurality of heat shields configured according to aspects of the invention.

The foregoing description is provided in the context of one possible ring seal segment for use in a turbine engine. However, aspects of the invention are not limited to ring seal segments. A CMC structure, as described herein, can be used in other areas of a turbine engine. For instance, the CMC structure can also be used as a heat shield 132 in the combustor section 134 of a turbine engine, as shown in FIG. 10. The combustor section 134 can include a liner 136 or other duct. The liner can have an inner peripheral surface 137 and an associated axis 138. One or more heat shields 132 can be operatively attached to the combustor liner 136 in any suitable manner, including any of those discussed above. In one embodiment, a plurality of heat shields 132 can be operatively attached to the inner peripheral surface 137 of the liner 136 in one or more rows. These heat shields 132 can protect the liner 136 from the hot combustion environment of the combustor section 134. The foregoing discussion of a ring seal segment 50 according to aspects of the invention has equal application to a heat shield 132 according to aspects of the invention. However, in the context of a heat shield 132, it is noted that the terms "axial," "radial" and "circumferential" and variations thereof, as used above, become relative to the axis 138 of the liner 136 when the heat shield 132 is installed in its operational position.

It will be understood that the invention is not limited to the specific details described herein, which are given by way of example only, and that various modifications and alterations are possible within the scope of the invention as defined in the following claims.

What is claimed is:

1. A turbine engine component comprising:

a ceramic matrix composite body having a base portion and frame portion, the base portion and the frame portion being unitary, the frame portion including at least three unitary side walls that enclose a space, wherein each side wall transitions at opposite ends into one of the other side walls, each side wall extending substantially radially outward from the base portion, and wherein each side wall transitions into the base portion such that the frame portion is closed on one side wherein the transition between two side walls occurs in a side wall transition region, wherein the ceramic matrix composite includes a ceramic matrix and a plurality of fibers therein, wherein at least some of the fibers span continuously across the side wall transition region and extend into a portion of each of the two side walls;

the turbine engine component further including a combustor liner, wherein the body is operative connected to the combustor liner, whereby the turbine engine component is a heat shield.

2. The turbine engine component of claim 1 wherein the base portion has a radially inner surface, wherein at least a portion of the radially inner surface of the base portion is coated with a thermal insulating material.

3. The turbine engine component of claim 1, wherein at least about 25% of the fibers in the side wall transition region span continuously across the side wall transition region and extend into a portion of each of the two side walls.

4. The turbine engine component of claim 1 wherein the fibers are provided in the form of a plurality of plies, wherein at least about 50% of the plies in the side wall transition region span continuously across the side wall transition region and extend into a portion of each of the two side walls.

5. The turbine engine component of claim 1 wherein the transition between at least one of the side walls and the base portion occurs in a transition region, wherein the ceramic matrix composite includes a ceramic matrix and a plurality of fibers therein, wherein with at least some of the fibers span continuously across the transition region and extend into a portion of each of the at least one side wall and the base portion.

6. The turbine engine component of claim 5, wherein at least about 25% of the fibers in the transition region span continuously across the transition region and extend into a portion of each of the at least one side wall and the base portion.

7. The turbine engine component of claim 5 wherein the fibers are provided in the form of a plurality of plies, wherein at least about 50% of the plies in the transition region span continuously across the transition region and extend into a portion of each of the at least one side wall and the base portion.

8. The turbine engine component of claim 1 further including at least one reinforcing wall enclosed by the at least three side walls, wherein the reinforcing wall is unitary with the base portion and at least one of the side walls of the frame portion.

9. The turbine engine component of claim 1 wherein the base portion has a radially inner surface, wherein a substantial majority of the fibers in the base portion extend substantially parallel to the radially inner surface.

10. A turbine engine component comprising:

a ceramic matrix composite body having a base portion and frame portion, the base portion and the frame portion being unitary, the frame portion including at least three unitary side walls that enclose a space, wherein each side wall transitions at opposite ends into one of the other side walls, each side wall extending substantially radially outward from the base portion, and wherein each side wall transitions into the base portion such that the frame portion is closed on one side wherein the transition between two side walls occurs in a side wall transition region, wherein the ceramic matrix composite includes a ceramic matrix and a plurality of fibers therein, wherein at least some of the fibers span continuously across the side wall transition region and extend into a portion of each of the two side walls;

the turbine engine component further including a stationary turbine support structure, wherein at least two of the side walls of the body are operatively connected to the stationary turbine support structure, whereby the turbine engine component is a ring seal segment.

11. A turbine engine ring seal segment comprising:

a ring seal segment body made of ceramic matrix composite, the ring seal body having a base portion and frame portion, the base portion and the frame portion being unitary, the frame portion extending substantially radially outward from the base portion, the frame portion having a forward side wall and an opposite aft side wall, the frame portion further including a first transverse side wall and an opposite second transverse side wall, wherein the first and second transverse side walls are angled relative to the forward and aft side walls, wherein the forward side wall transitions into each of the first and second transverse side walls, and wherein the aft side wall transitions at opposite ends into the first and second transverse side walls, wherein the transition between at least one of the side walls and the base portion occurs in a transition region, and wherein the ceramic matrix composite includes a ceramic matrix and a plurality of fibers therein, a plurality of fibers spanning continuously across the transition region.

12. The ring seal segment of claim 11 wherein the forward and aft side walls are substantially parallel to each other, and wherein the first and second transverse side walls are substantially parallel to each other, whereby the frame portion is substantially parallelogrammatic.

13. The ring seal segment of claim 11 wherein the forward and aft side walls are substantially parallel to each other, and wherein the first and second transverse side walls are non-parallel to each other, whereby the frame portion is substantially trapezoidal.

14. The ring seal segment of claim 11 wherein the ceramic matrix composite is an oxide-based ceramic matrix composite.

15. The ring seal segment of claim 11 wherein the base portion has a radially inner surface, wherein at least a portion of the radially inner surface of the base portion is coated with a thermal insulating material.

16. The ring seal segment of claim 11 wherein the transition between two side walls occurs in a side wall transition region, wherein the ceramic matrix composite includes a ceramic matrix and a plurality of fibers therein, and wherein at least about 25% of the fibers in the side wall transition region span continuously across the side wall transition region and extend into a portion of each of the two side walls.

17. The ring seal segment of claim 11 wherein the transition between two side walls occurs in a side wall transition region, wherein the ceramic matrix composite includes a ceramic matrix and a plurality of fibers therein, wherein the fibers are provided in the form of a plurality of plies, and wherein at least about 50% of the plies in the side wall transition region span continuously across the side wall transition region and extend into a portion of each of the two side walls.

18. The ring seal segment of claim 11 wherein at least about 25% of the fibers in the transition region span continuously across the transition region and extend into a portion of each of the at least one side wall and the base portion.

19. The ring seal segment of claim 11 wherein the fibers are provided in the form of a plurality of plies, and wherein at least about 50% of the plies in the transition region span continuously across the transition region and extend into a portion of each of the at least one side wall and the base portion.

* * * * *